United States Patent
Stephan

(10) Patent No.: US 6,473,562 B1
(45) Date of Patent: Oct. 29, 2002

(54) METHOD FOR LOW-SPEED OPERATION OF BRUSHLESS DC MOTORS

(75) Inventor: Waldemar Stephan, Dortmund (DE)

(73) Assignee: Wilo GmbH, Dortmund (DE)

( * ) Notice: Subject to any disclaimer, the term of this patent is extended or adjusted under 35 U.S.C. 154(b) by 0 days.

(21) Appl. No.: 09/645,521

(22) Filed: Aug. 25, 2000

(30) Foreign Application Priority Data

Sep. 6, 1999 (DE) .......................... 199 42 493

(51) Int. Cl.⁷ ................................ H02P 5/00
(52) U.S. Cl. ...................... 388/800; 318/254; 318/138; 318/439; 318/460; 318/479; 318/723; 318/809; 318/701; 318/778; 318/721
(58) Field of Search ................ 318/245, 254, 318/138, 139, 460–479, 723, 809, 439, 701, 721, 722, 778, 800; 62/228.4, 229, 158, 228.3, 126

(56) References Cited

U.S. PATENT DOCUMENTS

| | | | |
|---|---|---|---|
| 3,840,799 A | * 10/1974 | Macko et al. ............... 318/245 |
| 4,603,283 A | 7/1986 | Oltendorf .................... 318/254 |
| 4,633,158 A | * 12/1986 | Hirata et al. ................ 318/723 |
| 5,017,845 A | 5/1991 | Carobolante et al. ....... 318/138 |
| 5,225,759 A | 7/1993 | Endo et al. |
| 5,486,743 A | * 1/1996 | Nagai ........................ 318/439 |
| 5,723,967 A | * 3/1998 | Hongo et al. ............... 318/254 |
| 5,744,921 A | * 4/1998 | Makaran ..................... 318/254 |
| 5,857,349 A | * 1/1999 | Hamaoka et al. .......... 62/228.4 |
| 5,970,733 A | * 10/1999 | Hamaoka et al. .......... 62/228.4 |
| 6,014,004 A | * 1/2000 | Hamaoka et al. .......... 318/778 |

FOREIGN PATENT DOCUMENTS

| | | |
|---|---|---|
| DE | 35 43 047 | 6/1987 |
| EP | 0 822 651 A1 | 2/1998 |
| EP | 0 872 949 | 10/1998 |
| GB | 2 330 257 | 4/1999 |

* cited by examiner

Primary Examiner—Karen Masih
(74) Attorney, Agent, or Firm—Lowe Hauptman Gilman & Berner, LLP

(57) ABSTRACT

A method to operate an electronically commutated DC motor driving a centrifugal pump and comprising a stator fitted with at least one winding and a rotor fitted with permanent magnets, said method including a monitored stepping operation within which one full revolution of the rotor is constituted by a sequence of distinct individual steps, the rotor being accelerated by applying a stator field and being decelerated to a stop before the stator field is commutated.

9 Claims, 2 Drawing Sheets

METHOD FOR LOW-SPEED OPERATION OF BRUSHLESS DC MOTORS

TECHNICAL FIELD

The present invention relates to a method for operating an electronically commutated DC motor driving a centrifugal pump and comprising a stator fitted with at least one winding and a rotor fitted with permanent magnets.

BACKGROUND OF THE INVENTION

Such so-called brushless DC motors are gaining in significance jointly with the development of economical and reliable- power semiconductors. In such motors, unlike the heretofore voltage commutation by means of brushes, commutation instead takes place by the controlled switching of power semiconductors. In order that the microprocessor have the capability to rigorously coordinate the switching procedures, it must be fed with information regarding instantaneous rotor orientation. For that purpose and in known manner, the position of the magnets present in the rotor is measured either using Hall elements or by means of the back emf (BEMF) induced by the magnets in the stator windings, measurement of such BEMFs substantially being more economical than using Hall elements.

In recent times such brushless DC motors in addition to many other fields of application also have been used to drive centrifugal pumps of various designs.

Motors running on the basis of BEMF measurements however incur the drawback that at low motor speeds the measurement of BEMF's will fail because they are minute. On that account, or because of rest intervals, such brushless DC motors will stop below a minimum angular speed and thus cannot run. This problem hampers the use of such motors precisely as regards centrifugal pumps illustratively used in heating and aircondidoning circuits where they must service a large dynamic output range.

SUMMARY OF THE INVENTION

Therefore it is the objective of the present invention to create a method to operate brushless DC motors to drive centrifugal pumps, where said method does not resort to Hall elements and therefore offers in simple and economical manner pump operation also at very low powers and small quantities of:pumping media.

This problem is resolved by a method claimed in claim 1.

The method of the invention makes it feasible driving a brushless DC motor in the manner of a stepping motor, however in simpler manner and in controlled stepping operation. In the stepping operation of the invention, the rotor at first is accelerated by a pole core and then, before commutation, is allowed to come to a stop by deceleration, or, in a special mode of implementation, to be decelerated by a magnetic field. Controlled deceleration by the magnetic field offers the advantage that the rotor shall assume a given position whence the next step can be implemented.

This operation of the invention is especially appropriate to drive centrifugal pumps because each step feeds a small amount of pumping medium. In the process the feed pulses in the hydraulic system after a given path will be averaged to a comparatively uniform flow moving relatively slowly. The method of the invention makes it possible operating pumps with an output less than 10 ltr/h. Contrary to the case of stepping motors, the brushless DC motors controlled into the stepping mode are much simpler in design. Another advantage offered by the brushless DC motors is that they continuously can pass from the stepping mode into the mode of normal operation and can attain substantially higher angular speeds than do stepping motors.

When driving pumps, in some applications the rotor even may advantageously be decelerated to a stop before the next statorfield is commutated. In this manner the centrifugal pump's dynamic range may be utilized from nearly zero to the maximum rate of conveyed pumping medium.

The stepping operation of the invention advantageously is implemented by applying to the winding(s) a sequence of time-separated drive pulses. The pulse repetition frequency is predetermined according to the desired rate of pumped medium. The voltage is adjusted in such manner that the experted pump load shall be reliably overcome. In especially advantageous manner, the drive pulses are approximately square because such pulses are easily generated and in turn generate a nearly linearly rising, and hence easily monitored BEMF.

Advantageously the stepping operation is monitored by measuring the BEMF generated by the individual pulses to ascertain whether the rotor follows the stator field or if it is jammed. One method is preferred for such measurements: The preferred square drive pulse is shut off over a short measurement interval whereby this one drive pulse actually becomes two tightly following square pulses. The width of the measurement interval is selected in such manner as to allow measuring the BEMF in one winding. In particular the width of the measurement interval is less than about ¼ the pulse width.

This method is advantageously used when the rotor in its motion experiences a change in speed generating a BEMF that can be measured by the electronics. If a BEMF cannot be detected, rotor jamming must be assumed and thereupon the voltage of the next drive pulse shall be raised. The BEMF can be measured on one hand within the measurement interval or on the other hand, following the pulse's end, in the voltage-free interval between two drive pulses. To avoid spurious signals, the BEMF shall be measured in basically advantageous manner at the time when no current exists in the winding(s).

The method of the invention is characterized by high operational reliability. This method can be implemented using the components already present in the motor's control electronics and therefore it contributes to lowering the motor's manufacturing costs. In highly advantageous manner, the method of the invention is applicable to many different motor models.

Advantageously a test procedure separate from the normal stepping operation may be used to infer rotor jamming from the BEMF measurement. This test procedure may be initiated when turning ON the motor. The voltage and/or the pulse repetition frequency can be raised until a BEMF generated by the displaced rotor can be detected.

The method of the invention is crashed out in especially advantageous manner where there are two and preferably three windings. Drive pulses are applied to the windings commensurately to the desired direction of rotation, a pulse being wide enough to accelerate the rotor through the magnetic field and to decelerate it to a stop.

Centrifugal pumps controlled in the manner of the method of the invention are used in especially advantageous manner in the cooling system of motor vehicle. Precisely when such centrifugal pumps are operated as circulating pumps very low pump outputs may be enough to move the required quantities of coolants.

BRIEF DESCRIPTION OF THE DRAWINGS

A particular implementation of the method of the invention is elucidated below in relation to the drawings, in which.

The following discussion presumes that the regulation of such electronically commutated DC motors is known. illustratively such motors are fitted with an eight-pole permanent-magnet rotor of which the three windings are wired in delta. Commutation is implemented by a controller in the form of a microprocessor which in this instance drives six power semiconductors to apply current in series to the windings. Rotor rotation induces back emfs (BEMF) in the windings which can be measured at the phase windings and which denote the rotor position.

Using the method of the invention, the motor driving a centrifugal pump is controlled in such manner in a stepping-mode operation that a rotor rotation of one revolution is constituted by a sequence of distinct individual steps. For that purpose the rotor is accelerated by the application of a stator field in the form of a square drive pulse TP of voltage Us and is decelerated to a stop before the stator field is commutated. The attached Figure shows representative drive-pulse shapes, the voltage U as function of time t being plotted in the upper half of each (a) and (b). The lower portions of the diagrams (a) and (b) show the particular measurable BEMF in the form of a voltage UB as a function of time t.

Figure 2:
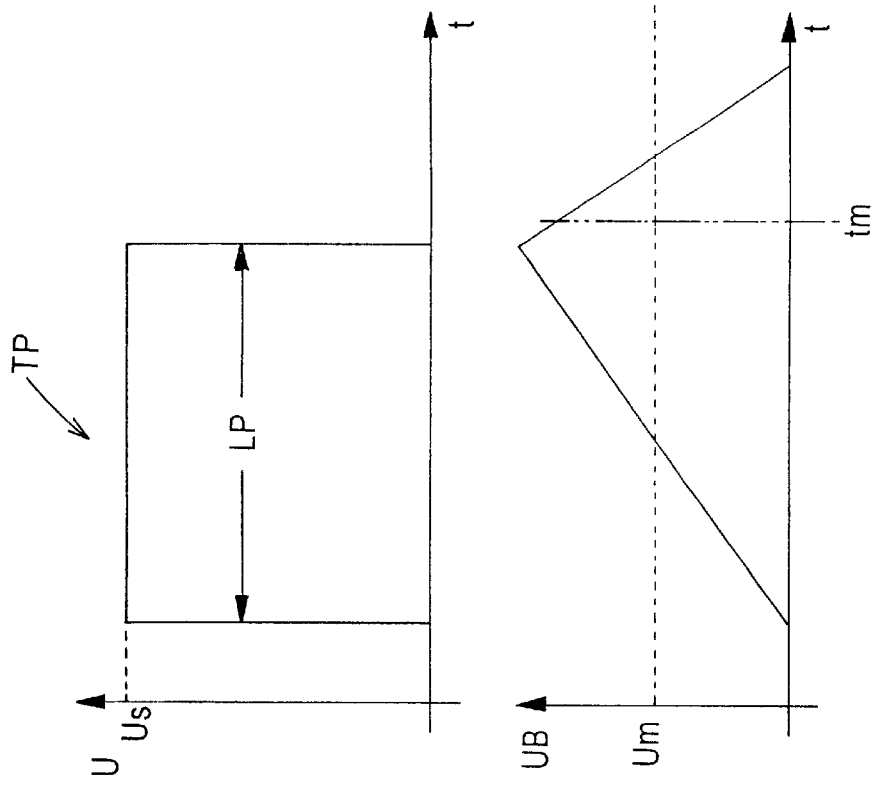
FIG. 2 shows a uninterrupted drive pulse and measurement of BEMF after the pulse.
Figure 1:
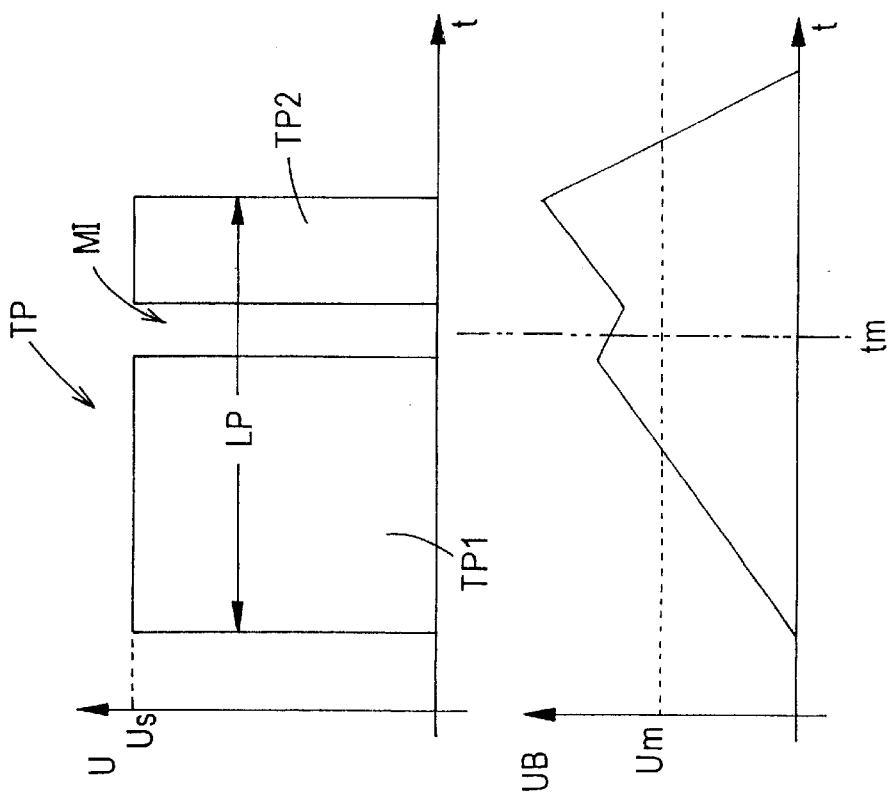
FIG. 1 shows a drive pulse briefly interrupted by a measurement interval during which BEMF is measured.
Figure 3:
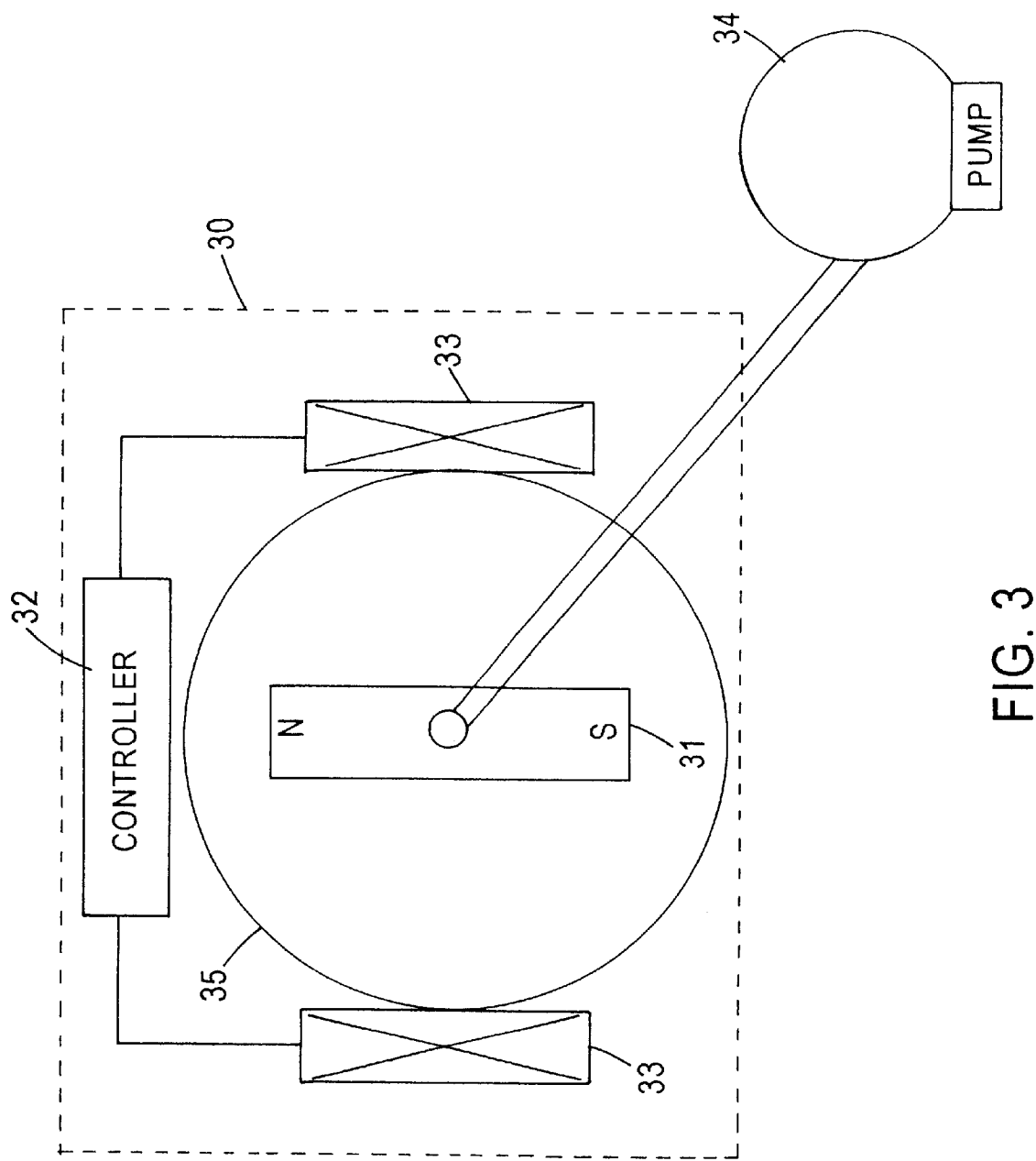
FIG. 3 is a diagram showing a circulating pump using a DC motor driven by the method of the invention.

FIG. 1 shows a drive pulse TP of width LP which is briefly interrupted at time tm by a measurement interval MI. The BEMF function rises continuously and commensurately within the first pulse segment TP1 and will briefly dip in the measurement interval MI and then rises to its maximum value in the pulse segment TP2. The electronic control unit measures the BEMF which is above a threshold value Um detectable by said electronics at time tm. FIG. 2 shows an uninterrupted drive pulse of length LP, the BEMF being measured by the electronics following the end of the pulse TP at time tm. FIG. 3 illustratively shows a motor 30 having a rotor 31 which is preferably a permanent magnet and a stator 35 equipped with a winding 33 which is connected to a controller 32. A pump 34 which is preferably a centrifugal pump is driven by motor 30.

What is claimed is:

1. A method of operating an electronically commutated DC motor in a stepping operation mode, the DC motor comprising a stator equipped with at least one winding and a rotor equipped with at least one magnet, said method comprising, within one revolution of the rotor and in series, the steps of:

accelerating the rotor by a stator field generated by said at least one winding;

decelerating the rotor to a stop by the stator field; and commutating the stator field;

wherein the stator field is generated by applying at least one drive pulse to said at least one winding, the drive pulse having a predetermined pulse width and being of a predetermined voltage, the predetermined pulse width being sufficiently wide to cause both said accelerating and decelerating.

2. The method of claim 1, wherein the drive pulse is square.

3. The method of claim 1, wherein the drive pulse is shut off over a measurement interval of a width narrower than ¼ of the predetermined pulse width of the drive pulse, said method further comprising the step of measuring, during the measurement interval, a back EMF (BEMF) induced in said at least one winding by the magnet of the rotor.

4. The method of claim 1, wherein a plurality of said drive pulses are supplied to said at least one winding, said method further comprising the step of measuring, during a voltage-free interval between two successive said drive pulses, a BEMF induced in said at least one winding by the magnet of the rotor.

5. The method of claim 1, wherein said at least one winding comprises three windings to which a plurality of said drive pulses are applied corresponding to a desired rotational direction of the rotor.

6. The method of claim 1, further comprising the step of measuring a BEMF induced in said at least one winding by the magnet of the rotor wherein no voltage is applied to said at least one winding during said BEMF measuring step.

7. The method of claim 1, comprising a testing step for diagnosing rotor jamming during which at least one of the voltage and a repetition frequency of the drive pulses is increased until a BEMF, induced in said at least one winding by the magnet of the rotor, can be measured.

8. A brushless DC motor, comprising:

a stator equipped with three windings;

a rotor equipped with permanent magnets; and a controller coupled to the windings and supplying thereto a series of drive pulses which cause generation and commutation of a stator field in the windings so that, within each revolution of the rotor, the rotor is both accelerated and then decelerated to a stop by the stator field before the stator field is commutated;

wherein said motor is operated in a speed range of less than 400 rpm.

9. A circulating pump in a cooling system of a motor vehicle, comprising:

a brushless DC motor; and a centrifugal pump driven by said brushless DC motor;

said brushless DC motor comprising:

a stator equipped with three windings;

a rotor equipped with permanent magnets; and a controller coupled to the windings and supplying thereto a series of drive pulses which cause generation and commutation of a stator field in the windings so that, within each revolution of the rotor, the rotor is both accelerated and then decelerated to a stop by the stator field before the stator field is commutated;

wherein said motor is operated in a speed range of less than 400 rpm.

* * * * *